March 14, 1961 L. MAYON 2,975,270
LAMP SHADE
Original Filed May 23, 1956 2 Sheets-Sheet 1
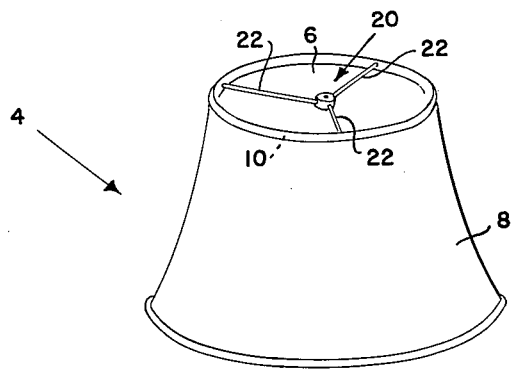
FIG. 1.
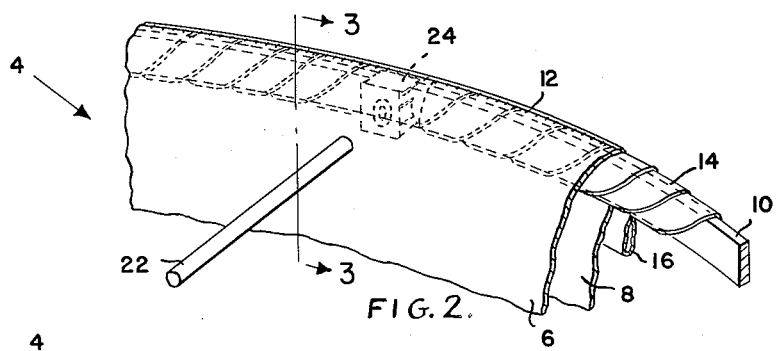
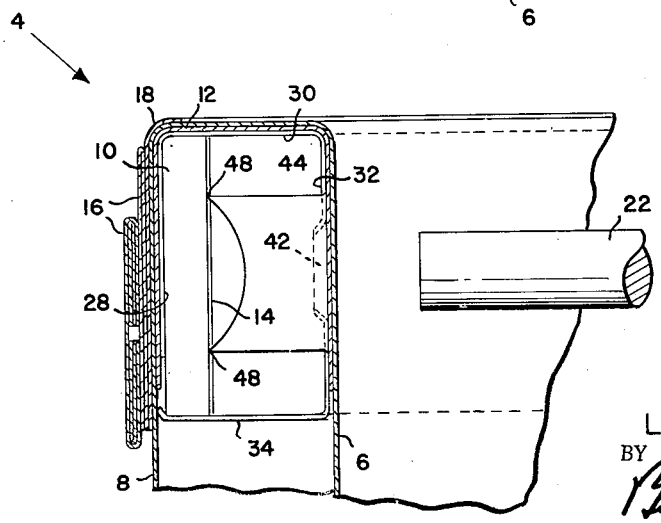
INVENTOR.
LEON MAYON
BY
ATTORNEYS March 14, 1961  L. MAYON  2,975,270
LAMP SHADE Original Filed May 23, 1956  2 Sheets-Sheet 2

INVENTOR.
LEON MAYON
BY
ATTORNEYS

United States Patent Office 2,975,270
Patented Mar. 14, 1961

2,975,270

LAMP SHADE

Leon Mayon, Philadelphia, Pa., assignor to W & M Corporation, Philadelphia, Pa., a corporation of Pennsylvania Original application May 23, 1956, Ser. No. 586,696, now Patent No. 2,900,865, dated Aug. 25, 1959. Divided and this application July 14, 1958, Ser. No. 748,484

3 Claims. (Cl. 240—108)

This invention relates to an improved fastening device and, more particularly, to an improved fastening device adapted for use in lamp shades and to the combination of a lamp shade having the spokes of a spider element mounted on an upper ring of a rigid lamp shade frame by the improved fastening device.

This application is filed as a division of my copending application, Serial No. 586,696, filed May 23, 1956, now U.S. Patent No. 2,900,865, issued August 25, 1959.

Heretofore lamp shades have been constructed by applying a fabric covering over a rigid frame which is generally made of wire or sheet metal and having a spider element including spokes fastened to an upper ring of the rigid frame prior to the application of the covering fabric and by means of soldering or the like. This construction requires that the fabric covering be slit and sewn around the spokes of the spider element. This slitting and sewing involves hand operations adding materially to the cost and difficulty involved in the manufacture of the lamp shade.

It is the primary object of this invention to provide a lamp shade frame which may be covered with a fabric without involving the difficulty of slitting and sewing the fabric around the spokes of the spider element. To accomplish this the upper rim of the lamp shade frame is provided with novel fastening means into which the ends of the spokes of the spider element can be inserted after the lamp shade covering fabric has been completely applied to the lamp shade.

It is another object of the invention to provide a fastening device adapted to receive and secure a smooth or serrated end of a rod and support the rod in rigid relation with a bar element around which the fastening means is clamped.

These and other objects of the invention will become apparent from the following description when read in conjunction with the accompanying drawings, in which:

Figure 1 is a perspective view of a lamp shade constructed in accordance with the invention;

Figure 2 is a partially cut-away fragmentary view of the lamp shade showing the fastening device in position thereon;

Figure 3 is a fragmentary section through the lamp shade taken on the trace 3—3 of Figure 2;

Figure 4:
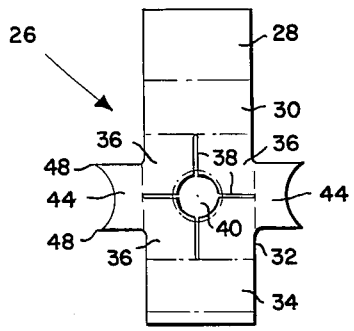
Figure 4 is a development of the blank from which the fastening device is formed.

Referring to Figures 1–3, the fastening device 24 is positioned over a circular rim 10 forming the upper ring of the lamp shade indicated generally at 4. A fabric covering including inner and outer sheets of material 6 and 8, respectively, are positioned over the lamp shade frame and are sewn together, as indicated at 12, along the top of the circular rim 10. Suitable padding in the form of a spiral wound fabric material 14 is interposed between the rim and the fabric. The arrangement of the fabric covering and the trim may be conventional and forms no part of the present invention.

A trim braid or other suitable material, shown at 16 in Figure 3, is attached to a strip of fabric 18 which is sewn with the inner and outer sheets of fabric 6 and 8 and secured therebetween. As shown in Figure 2, fastening means 24 are positioned over the rim 10 prior to the application of the fabric. After the fabric has been applied to the lamp shade frame, a spider assembly, indicated generally at 20 in Figure 1, and including a plurality of spokes 22 is positioned inside of the rim 10 and the radially outer ends of each of the spokes 22 are pressed through the inner fabric 6 and into a fastening means 24.

In Figure 4 there is shown generally at 26 the development of the blank from which the fastening means, which is shown generally at 24 in Figures 5–8, is formed. The fastening means is preferably formed from a flat sheet of spring steel and includes a rear flange 28, a top flange 30, a front flange 32 and a bottom flange 34. The front flange 32 is formed with four portions 36 separated by cut lines 38 joining a central bore 40 providing for the reception of the ends of the spokes 22. The edges of the portions 36 adjacent to the bore 40 are depressed, as indicated at 42, and are deformed upon the entrance of a spoke 22 serving to secure the spoke therein. A pair of wings 44 extend outwardly from the sides of the front face 32 of the fastener and are formed with concaved outermost edges providing corner points 48 which are adapted to bear against the inner face of the rim 10 while the rear flange 28 of the fastener engages the outer face of the rim 10, thus serving to secure the fastener in position on the rim in conjunction with the supporting action of the upper flange 30 and the lower flange 34 which engage the upper and lower faces, respectively, of the rim 10.

Figure 5:
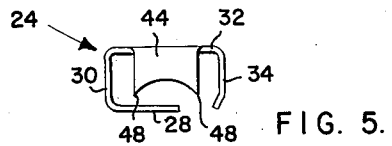
Figure 5 is a side elevation of the fastening device.
Figure 6:
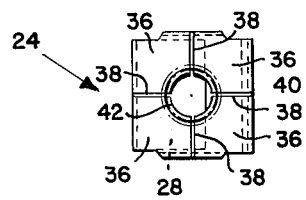
Figure 6 is a front view of the fastening device.
Figure 7:
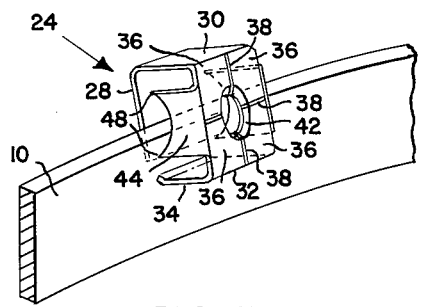
Figure 7 is a perspective view of the fastening device in the process of being forced onto a flat upper ring of a rigid frame.
Figure 8:
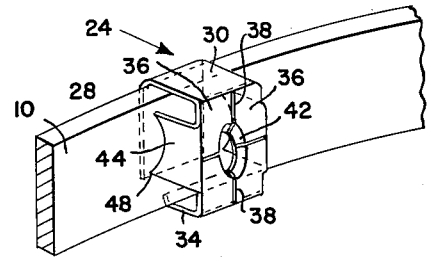
Figure 8 is a perspective view of the fastening device in position on the flat upper ring of a rigid frame.

As previously described, the fastening means shown in Figures 4, 5 and 6 is applied to the rim 10 as shown in Figures 7 and 8 in suitable positions thereon prior to the application of covering fabric to the lamp shade frame incorporating the rim 10 as the upper rim thereof. Thereafter, the wrapping 14 is applied on the rim 10 between the fastening means and the shade covering fabric is applied without the application thereof being encumbered by the presence of the spokes 22 of the spider assembly. After the covering has been applied, the inner covering fabric may be perforated in alignment with the bore 40 of each of the fastening means and the ends of the spokes of the spider inserted therein. The flanges 42 surrounding the bores 40 in the fastening means will engage the end portions of the rods 22 and secure them in a desired position with respect to the lamp shade frame. This operation produces neat round holes in the fabric through which the spider rods pass and the construction provides for a simple and inexpensive method of producing a lamp shade.

It will be evident that in place of the combination of the flat band 10 and the fastener shown a band may be employed of lesser depth than the band 10 and the fastener provided to secure the outermost ends of the spider rods in position below the bands 10. While this is a less desirable construction, it does serve the advantage of reducing the bulk of the fastener in a radial direction and, in some instances, when particularly fine and inelastic covering means are employed, this reduction in radial dimension is desirable. From the foregoing, it will be evident that this and other modifications may be made to the embodiment of the invention disclosed herein without departing from the scope of the invention as set forth in the following claims.

What is claimed is:

1. A lamp shade including a rigid frame, a covering material covering said frame, said frame including a substantially rigid ring, fastening means secured to said ring under said covering and a spider having arms extending through said covering, into said fastening means and secured thereby, each of said fastening means comprising a sheet of metal formed with areas thereof adapted to lie adjacent to opposite surfaces of said ring, one of said areas being formed for flatwise engagement with the outer of said surfaces, the other of said areas being formed with flanges extending toward and for engagement with the inner of said surfaces thereby to space the last mentioned area therefrom, and said last mentioned area being provided with an opening for the reception of a spider arm and having flanges deformable towards the last mentioned surface adjacent to the opening adapted to be deformed by and to engage a spider arm extending through said opening.

2. A lamp shade including a rigid frame, a covering material covering said frame, said frame including a substantially rigid ring, fastening means secured to said ring under said covering and a spider having arms extending through said covering, into said fastening means and secured thereby, each of said fastening means comprising a sheet of metal formed with areas thereof adapted to lie substantially parallel to opposite surfaces of said ring, one of said areas being formed to lie in flatwise engagement with the outer of said surfaces, the other of said areas being formed with flanges extending toward and provided with pointed projections for engagement with the inner of said surfaces thereby to space the last mentioned area therefrom, and said last mentioned area being provided with an opening for the reception of a spider arm and having flanges deformable towards the last mentioned surface adjacent to the opening adapted to be deformed by and to engage a spider arm extending through said opening for securing said spider arm in fixed relation with respect to said ring.

3. A lamp shade including a rigid frame, a covering material covering said frame, said frame including a substantially rigid ring, fastening means secured to said ring under said covering and a spider having arms extending through said covering, into said fastening means and secured thereby, each of said fastening means comprising a sheet of metal formed to substantially encircle said ring with areas thereof adapted to lie substantially parallel to opposite surfaces of said ring, one of said areas being formed to lie in flatwise engagement with the outer of said surfaces, the other of said areas being formed with flanges extending toward and provided with spaced projections for engagement with the inner of said surfaces thereby to space the last mentioned area therefrom, and said last mentioned area being provided with an opening for the reception of a spider arm and having flanges deformable towards the last mentioned surface adjacent to the opening adapted to be deformed by and to engage a spider arm extending through said opening and in engagement with said other of said surfaces for securing said spider arm in fixed substantially abutting relation with respect to said ring.

References Cited in the file of this patent

UNITED STATES PATENTS

| | | |
|---|---|---|
| 2,302,267 | Sher | Nov. 17, 1942 |
| 2,483,354 | Stiffel | Sept. 27, 1949 |
| 2,622,190 | Sher | Dec. 16, 1952 |
| 2,697,862 | Flora | Dec. 28, 1954 |